(12) United States Patent
Won

(10) Patent No.: US 6,705,750 B1
(45) Date of Patent: Mar. 16, 2004

(54) ELECTRIC DRIVEN LIGHTING

(75) Inventor: Jung Myung Won, Icheon-si (KR)

(73) Assignee: Boo Kwang Lighting Co., Ltd., Icheon-si (KR)

( * ) Notice: Subject to any disclaimer, the term of this patent is extended or adjusted under 35 U.S.C. 154(b) by 0 days.

(21) Appl. No.: 10/347,234

(22) Filed: Jan. 21, 2003

(30) Foreign Application Priority Data

Jan. 30, 2002 (KR) .......................................... 2002-5404

(51) Int. Cl.7 .............................................. F21V 21/26
(52) U.S. Cl. ........................ 362/419; 362/427; 362/428
(58) Field of Search ................................ 362/411, 413, 362/419, 427, 428

(56) References Cited

U.S. PATENT DOCUMENTS 5,045,986 A * 9/1991 Lin ............................. 362/413

* cited by examiner

Primary Examiner—David Vu
(74) Attorney, Agent, or Firm—Robert E. Bushnell, Esq.

(57) ABSTRACT

The present invention generally relates to an electric driven lighting electrically controlling a light head by a timing belt connected with a driving motor, and more specifically, to an electric driven lighting comprising: a driving motor generating a rotary power by using an electric force; a transmitter transmitting the rotary power to a separated position; a housing having a predetermined coupler as supporting the driving motor; an operating switch operating the driving motor; a main control board controlling the driving motor according to the operating switch; a light head gear physically coupled with the housing through a predetermined connector, and receiving the rotary power of the driving motor through the transmitter; and a light head coupled with the light head gear, and having a lamp socket and a reflector.

6 Claims, 8 Drawing Sheets

(a)

(b)

ELECTRIC DRIVEN LIGHTING

CLAIM FOR PRIORITY

This application claims priority to an application entitled "ELECTRIC DRIVEN LIGHTING", filed in the Korean Industrial Property Office on Jan. 30, 2002 and assigned Ser. No. 2002-5404, the contents of which are hereby incorporated by reference.

DETAILED DESCRIPTION OF THE INVENTION

Field of the Invention

The present invention generally relates to an electric driven lighting, and more specifically, to an electric driven lighting controlling a light head by using a driving motor and a timing belt connected to the driving motor.

Domestic lighting equipment for desk lamps has been developed, focusing on design and lamps only, therefore the control method of lighting equipment was not highlighted. As a result, existing lighting equipment for desk lamps is supposed to control the height or position by manually controlling the angle of a head cap where a light source is located. However, the existing equipment manually operating the position of a light source(light head) adopts the following two methods to fix the light head, causing problems.

1. Fixing Method by a Frictional Force of Packing

It is a fixing method using packing made of hard rubbers or plastics on a lever part of a head cap fixing unit. When the packing made of hard rubbers or plastics is worn away owing to a frequency position control and a head cap is unstably fixed due to abrasion of the fixing unit, a fixing screw of the lever part should be tightened again to stabilize a position of the light source, that is, the head cap.

2. Multi-Level Fixing Method Using the Irregularities of Bearing

It is a multi-level fixing method using a circular part concave along the circumference of a convex part and a fixing part of a bearing. When the concave circular part is worn away, a fixing screw should be tightened again like a fixing method by a frictional force of packing, to compensate the loose screw. If the worn state deteriorates, the concave circular part will be transformed to an oval shape. Therefore, it is impossible to stably control the position.

The fixing part stably fixing the light header is very important in an electric driven lighting. So, when the fixing part of the light header malfunctions, the electric driven lighting can be useless. However, the existing method can loose the fixing part of the light header owing to abrasion.

SUMMARY OF THE INVENTION

To solve the above problems, it is an object of the present invention to provide an electric driven lighting controlling a light header by using an electric gear system.

It is another object of the present invention to provide an electric driven lighting mounting a position sensor for automatically sensing the upper/lowest points and a limit point of transmission shafts, thereby preventing device damage caused by a wrong operation by a user familiar with an existing manual method, who manually operates the position because he or she forgets the electricpowered state of a device.

To solve theses objects, an electric driven lighting for electrically operating a light head in accordance with the present invention comprises: a driving motor generating a rotary power by using an electric force; a transmitter transmitting the rotary power of the driving motor to a separated position; a housing supporting the driving motor, and having a predetermined coupler; an operating switch operating the driving motor; a main control board controlling the driving motor according to the operating switch; a light head gear physically coupled with the housing through a predetermined coupler, and receiving the rotary power of the driving motor through the transmitter; and the light head coupled with the light head gear, and having a lamp socket and a reflector.

More desirably, the transmitter is composed as a timing belt. By using the timing belt, noise problem has been resolved and an electric power could be stably transmitted. Except the timing is belt, a gear system having little noise can be applied.

The light head gear in accordance with the present invention further comprises a position sensor, and the housing further comprises a position control sensor board inputting a sensing signal from the position sensor, thereby easily controlling the upper and lowest position of the light head.

The light head gear used in the present invention comprises: a head connector with a square shape whose two joint lines are missing, having a coupler connected to the light head located in a head section of the square shape, and having a tail section divided into two sections, then having a corner piercing groove; a timing belt connector inserted between the corner piercing groove, forming a groove receiving the rotary power of the timing belt, and forming the corner piercing groove inside; a light head rotary coupled body inserted into the corner piercing grooves of the head connector and the timing belt connector, and composed of a corner bar having a circular piercing groove inside; and a coupling screw coupling the light head rotary coupled body with the housing by using the predetermined coupler of the housing and the piercing groove of the corner bar.

The motor driver used in the present invention comprises a motor supporting board and a fixing screw. The motor supporting board has a driving motor for converting an inputted electric power into a mechanical rotary power, and a predetermined rectangular piercing groove on a front side. At least two vertical plates are located on an inner separated side, being vertically extended. A lower supporting plate forming a circular piercing groove and a piercing groove coupled with the rectangular piercing groove are formed on the end of each vertical plate. Predetermined projectors inserted into the circular piercing groove of the lower supporting plate are formed on both back sides of the motor supporting board. The fixing screw is inserted into the piercing groove of the motor supporting board and the rectangular piercing groove, thereby easily installing the timing belt by vertically rotating the circular piercing groove with the motor supporting board.

The motor driver further comprises an empty cylinder bar-shaped interval maintaining bar inserted into the fixing screw, to control an exact position of a motor.

DETAILED DESCRIPTION OF THE PREFERRED EMBODIMENT

The present invention will now be described more fully hereinafter with reference to the accompanying drawings, in which preferred embodiments of the invention a re shown.

Figure 1:
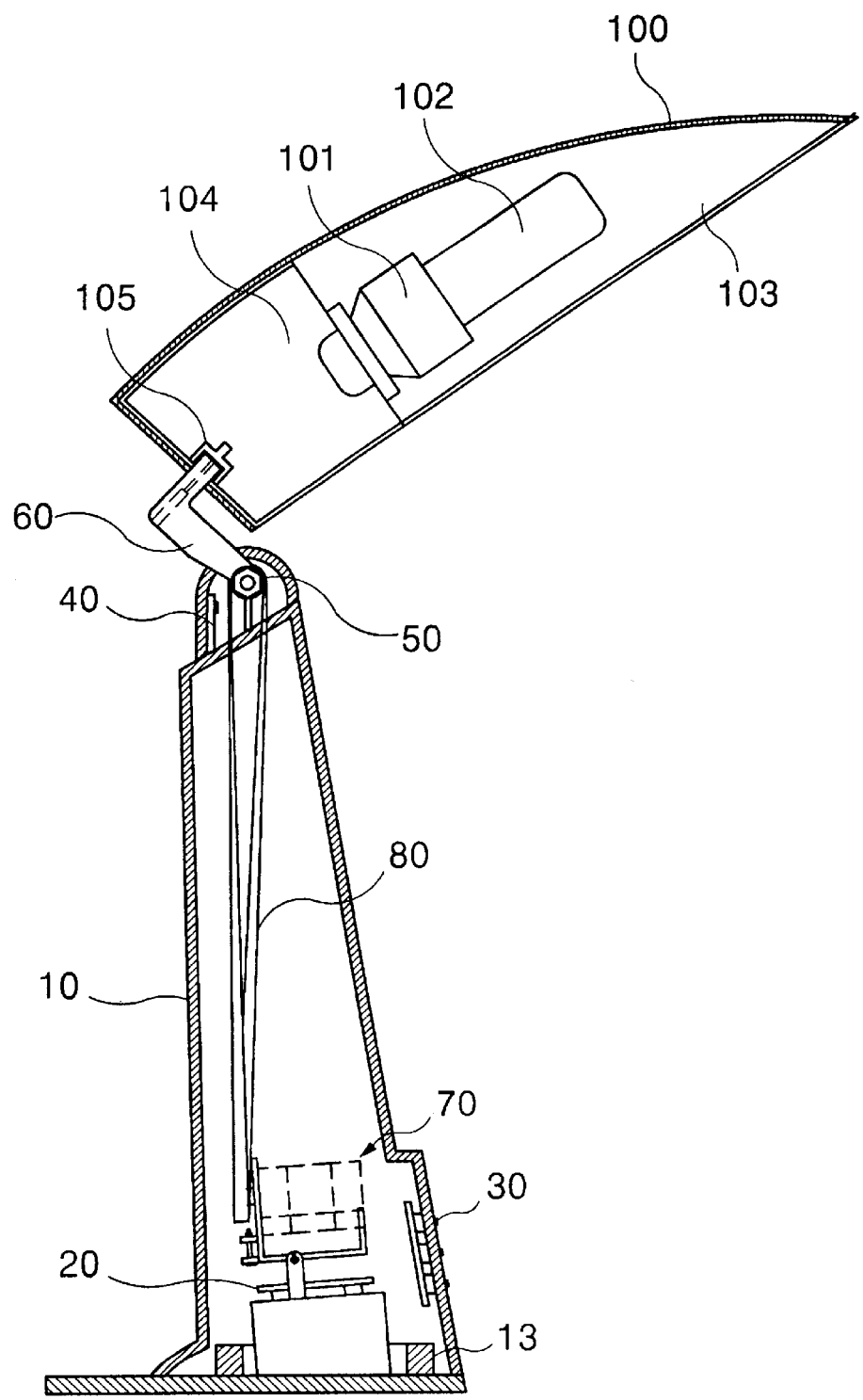
FIG. 1 is a perspective view illustrating an electric driven lighting with one embodiment of the present invention.

FIG. 1 is a perspective view illustrating an electric driven lighting with one embodiment of the present invention. The electric driven lighting in accordance with the present invention comprises: a driving motor(70); an operating switch (30); a main control board(20); a timing belt(80) transmitting a rotary power of the driving motor(70); a housing(10) supporting the driving motor(70), and forming a predetermined coupler on an upper part; a light head(100) having a lamp socket(101); and a light head gear(50) transmitting the rotary power of the driving motor(70) to the light head(100) through the timing belt(80).

The electric driven lighting of the present invention installs an empty ring-shaped weight(13) on a lower part of the housing(10), not to be inclined by heavy weight of the light head(100). It can keep the balance by weight of the driving motor(70). However for more stability, the ring-shaped weight(13) is installed.

The operating switch(30) is installed on a lower front of the housing(10). There are on/off switches turning on/off a lamp(102), and up/down switches vertically operating the light head(100).

The operating switch(30) is connected to the main control board(20) by a connector. The main control board(20) is not shown in a diagram, however it is connected to a power applying line applied from an exterior, thereby turning on/off the lamp(102) by the on/off switches of the operating switch(30) or generating a control signal folding/unfolding the light head(100) by operating the light driving motor(70) according to the up/down switches.

A position controlling sensor board(40) is installed on a back of the housing(10), to sense the upper and lowest limit of the light head gear(50). The position controlling sensor board(40) is electrically connected to the main control board(20) through the connector, even though it is not shown in the diagram. Not shown in the diagram, wiring relation of the electric driven lighting in accordance with the present invention is as follows. The operating switch(30) and the position controlling sensor board(40) are connected to the main control board(20) through the connector, respectively. A power line applied from an exterior is electrically connected to the lamp socket(101) through a back side of the light head gear(50) via housing inside after passing through the main control board(20). In addition, the main control board(20) and the driving motor(70) are electrically connected to transmit a control signal of the main control board(20) and an externally applied power to the driving motor(70).

The rotary power of the driving motor(70) is transmitted to a light head gear(50) by using the timing belt(80). The light head gear(50) transmits the rotary power of the driving motor(70) to the light head(100) through the head connector (60). The light head(100) is coupled with a socket supporter (104) supporting the lamp socket(101) and having a screw coupler(105) coupled with the head connector(60). The lamp socket(101) is coupled with the socket supporter(104), and the lamp(102) is coupled with the lamp socket(104). A reflector(103) downwardly reflecting light of the lamp(102) is formed in the light head(100).

Figure 2:
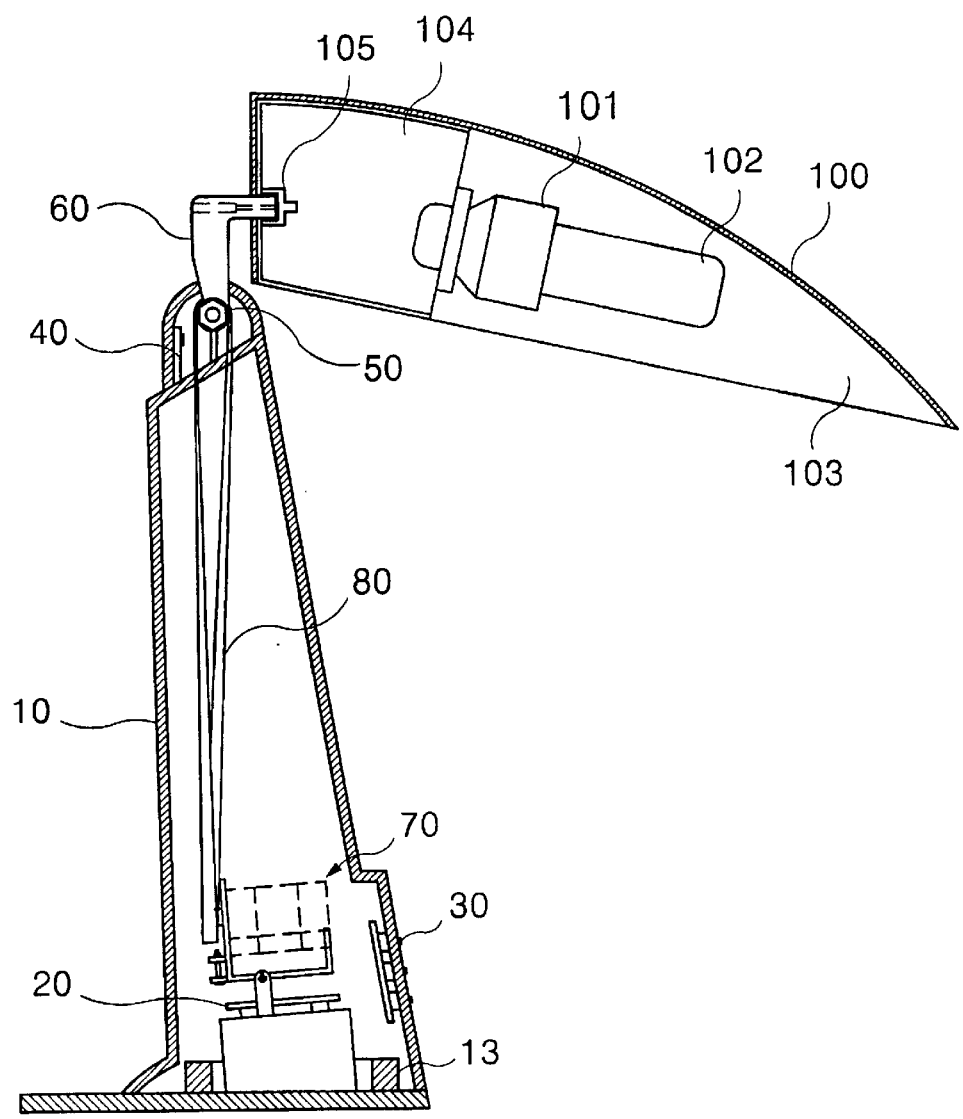
FIG. 2 is a perspective view illustrating a light head folded downward in accordance with an electric driven lighting with one embodiment of the present invention shown in FIG. 1.

FIG. 2 is a perspective view illustrating a light head of an electric driven lighting with one embodiment of the present invention, which is slightly folded downward. When pressing a down switch of an operating switch(30), a driving motor(70) is rotated by a control signal of a main control board(20), thereby turning a timing belt(80). A light head gear(50) is rotated by the timing belt(80), and a rotary power is transmitted to a light head(100) through a head connector (60), thus slightly folding it downward like shown in FIG. When keeping pressing the down switch, a lower side of the light head(100) is fully folded in a housing(10). At this time, it is defined as the lowest point where the light head gear moves, and on the contrary, the light head(100) can be fully unfolded by an up button of the operating switch(30). At this time, it is defined as an upper point where the light head gear moves in maximum. When the light head(100) is located in the lowest point, it is the darkest point, used as mood lighting. On the other hand, when the light head(100) is located in the upper point, it can be used as lighting over the widest range.

Figure 3:
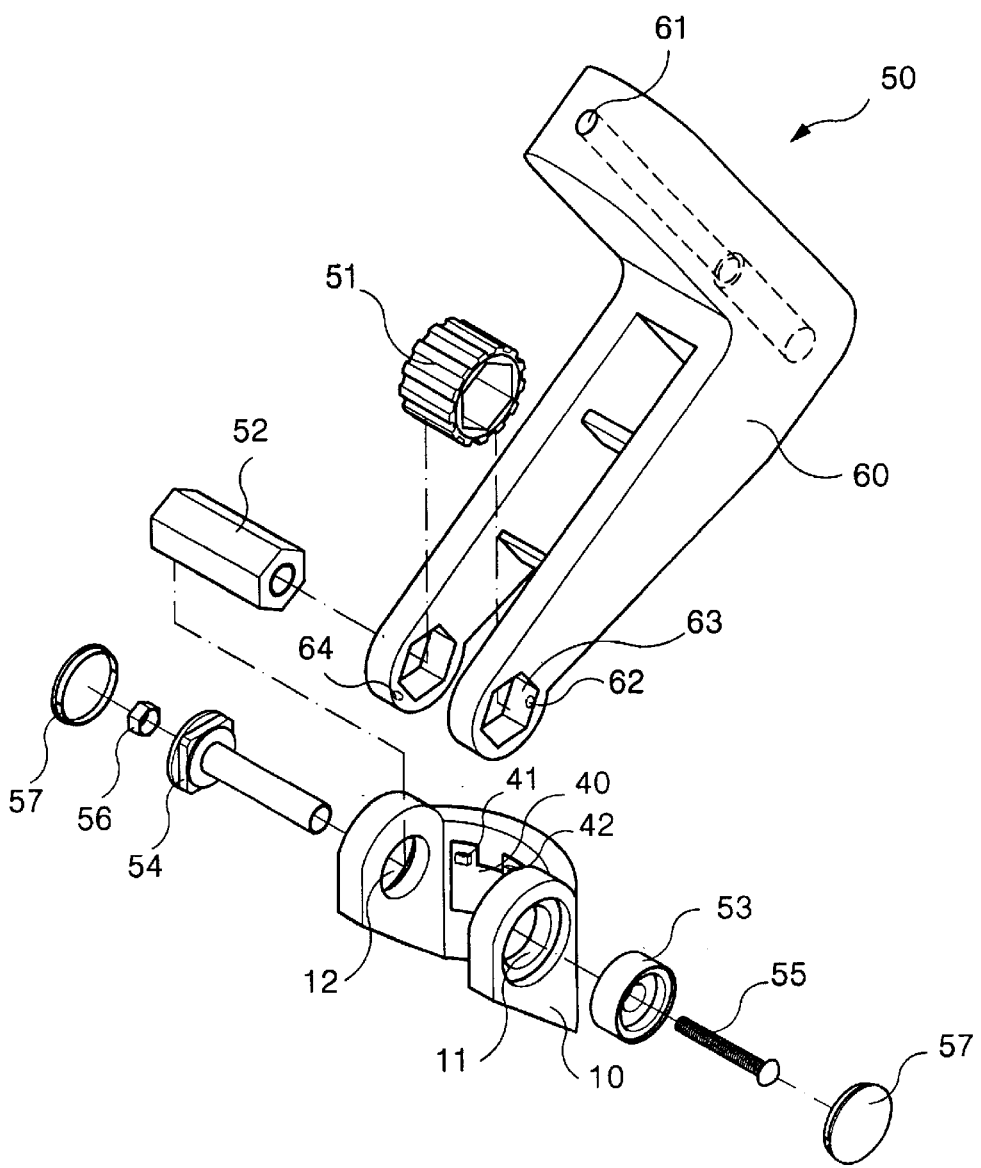
FIG. 3 is an assembly perspective view illustrating a light head gear with one embodiment of the present invention.

FIG. 3 is an assembly perspective view of a light head gear(50) with one embodiment of the present invention. A head connector(60) with a square shape whose two joint lines are missing is coupled with a light head(100) by using a screw groove(61). Therefore, when the head connector(60) rotates within a certain range, the light head(100) moves along it, thereby controlling the light head(100) by a driving motor. The light head(100) forms a hexagonal groove(62) for inserting a hexagonal bar(52) like shown in FIG. 3. Two small grooves(62, 64) are formed around the hexagonal groove(62), inserting magnets to each groove. The magnets inserted into the small grooves(62, 64) sense the upper and lowest position of the light head(100), respectively. To see this ~function, when the small groove(64) is positioned in a sensor(41) of a sensor board(40) for controlling a position while the head connector(60) is rotatively folded, a main control board(20) considers it as the lowest point and stops the motor. When the small groove(62) is positioned in a sensor(42) of the sensor board(40) while the head connector (60) is rotated as the light head is unfolded, the main control board considers it as the upper point and stops the motor.

Referring to FIG. 3, an assembled state of the head gear will be described as follows. A timing belt connector(51) is located in the middle of an inserting groove(63) formed in the head connector(60), and the hexagonal bar(52) is inserted into the inserting hole and a hexagonal inserting hole formed by the timing belt connector(51). The length of the hexagonal bar(52) is approximately bigger than a distance between the inserting groove(63) formed on the head connector(60), and is the same as or smaller than a distance between an external area of the inserting groove(63). The hexagonal bar(52) has a circular piercing groove inside. The head connector(60) coupled with the hexagonal bar(52) and the timing belt connector(51) is located between connecting grooves(11, 12) of a housing(10). Tightening screw housings (54, 53) are inserted into the circular piercing groove of the hexagonal bar(52), and they are tightened by using a nut(56) and a bolt(55). A concave square is formed on an external surface(not shown) of the connecting grooved(12) of the housing(10), to be inserted into a square shape of the tightening screw housing(54). A nut is fixed inside of an external surface(not shown) of the tightening screw housing (54), to form the same shape as an external shape of the nut. After coupling it with the bolt(55) and the nut(56), an external protection cap(57) is inserted into external surfaces of the tightening screw housings(54, 55), respectively.

The light head gear(50) operates as follows. The timing belt connector(51) is rotated by a timing belt(not shown). The hexagonal bar(52) is rotated by a rotary power of the timing belt connector(51), and the head connector(60) is rotated by a rotary power of the hexagonal bar(52). At this time, the hexagonal bar(52), the timing belt connector(51), and the head connector(60) are rotated by a pivot formed with the tightening screw housings(53, 54) pierced into the hexagonal bar(52) and the bolt(55) and the nut(56) coupling the tightening screw housings(53, 54).

Figure 4:
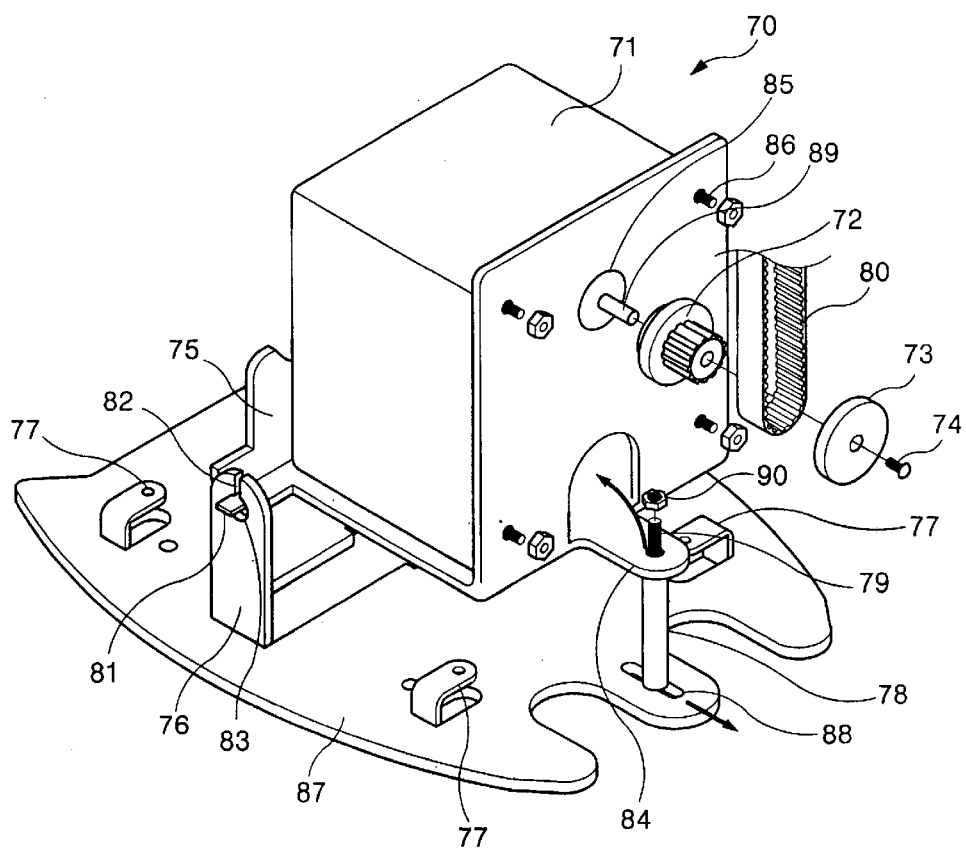
FIG. 4 is a detail drawing of a driving motor with one embodiment of the present invention.

FIG. 4 is a detail drawing of a driving motor with one embodiment of the present invention. The driving motor(70) is divided into a motor lower supporting plate(87), a motor vertical supporting plate(76), and a motor fixing housing (75). The motor vertical supporting plate(76) and the motor lower supporting plate(87) are separately made, however the motor vertical supporting plate(76) is formed by vertically molding a cut part of the motor lower supporting plate(87) after cutting it when substantially fabricating the motor vertical supporting plate.

More specifically, a connector(77) for connecting a main control board(20; not shown in FIG. 4) is formed on the motor lower supporting plate(87) in a convex shape near four edges like shown in the diagram, and a rectangular groove(88) is formed on the front. In addition, the motor vertical supporting plate(76) is formed vertical to the motor lower supporting plate(87). A straight-line inserting groove (82) for inserting the motor fixing housing(75) and a rotating groove(83) extended with the straight-line inserting groove are formed on an upper part of the motor vertical supporting plate(76).

The motor fixing housing(75) has a motor rotating axis connecting groove(85) for inserting a motor rotating axis and an interval controlling projected plate(84) on a lower part. A piercing groove is formed in the middle of the interval controlling projected plate(84). Connecting plates (81) for connecting to the motor vertical supporting plate (76) are projected on both sides of the motor fixing housing (75). To insert the motor fixing housing(75) to the motor vertical supporting plate(76), the motor fixing housing(75) is firstly rotated in 90 degrees by a pivot of the both connecting plates(81) in a counterclockwise direction from the state of FIG. 4. Next, the connecting plates(81) are inserted into the rotating groove(83) by using the straight-line inserting groove(82), and the motor fixing housing(75) is re-rotated in a clockwise direction by a pivot of the both connecting plates(81) like shown in FIG. 4.

A driving motor(71) is fixed into the motor fixing housing (75) like shown in FIG. 4, by using a bolt(86) and a nut using piercing grooves formed on four edges of the motor fixing housing(75). A rotating axis(89) of the driving motor(71) is externally projected by passing through the motor rotating axis connecting groove(85), and a screw groove(not shown) is formed in the middle of the rotating axis(89). A timing belt connector(72) and a timing belt guide(73) are inserted into the rotating axis(89) in order, and they are coupled with the rotating axis connecting groove(85) formed in the middle of the rotating axis(89) by using a bolt(74). A timing belt(80) operates without being separated toward outside, by the timing belt connector(72) and the timing belt guide(73).

An AC synchronous gear motor is used as the driving motor(71) in the present invention. The rotating axis of the motor is not rotated by a physical force unless power is applied, therefore it is appropriate for light equipment of the present invention.

A rotary power of the driving motor(71) is transmitted to the timing belt connector(51) by using the timing belt(80) in the present invention. Thus, the driving motor(71) and the timing belt connector(51) should be tightened by the timing belt all the time. To keep tightening the timing belt, a light head gear(50) is firstly assembled while connecting the timing belt(80) like shown in FIG. 3. Next, a front side of the motor fixing housing(75) is lifted up in an upper arrow direction by a pivot of the rotating groove(83) and the connecting plates(81). At this time, a motor interval maintaining bar(78) is slightly slid into a front side along the rectangular piercing groove(88). Then, the timing belt(80) is inserted between the timing belt connector(72) and the timing belt guide(73) in a loose state, and the front side of the motor fixing housing(75) is lowered by a pivot of the rotating groove(83) and the connecting plates(81), thereby tightening the timing belt(80).

Figure 5:
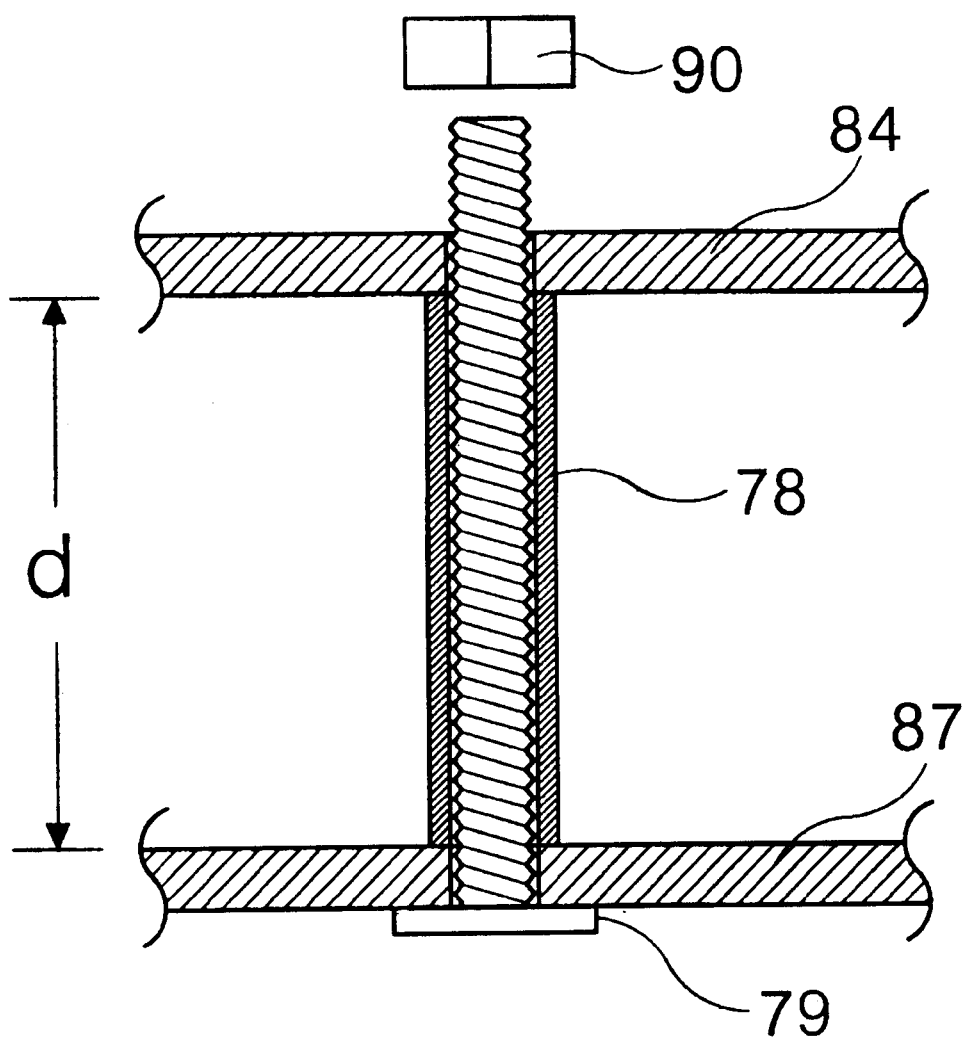
FIG. 5 is a sectional view illustrating a detailed configuration of a motor interval controlling screw for maintaining intervals of a timing belt.

FIG. 5 is a sectional view illustrating a detailed configuration of a motor interval controlling screw for maintaining intervals of a timing belt. To tighten a timing belt(80), it is necessary to maintain intervals between a driving motor(71) and a motor lower supporting plate(87). To implement this object, the present invention uses a configuration of FIG. 5. A motor interval controlling screw(79) passing through a rectangular passing groove(88) formed on the motor lower supporting plate(87) is inserted downward. A head part of the motor interval controlling screw(79) is big enough not to pass through the rectangular passing groove(88). Next, a motor interval maintaining bar(78) is inserted from the top, and a piercing groove is lowered up to the motor interval maintaining bar(78) in the middle of an interval controlling projected plate(84). Then, an interval between the driving motor and the motor lower supporting plate(87) is maintained as "d" by tightening it by an interval fixing nut(90).

Figure 6:
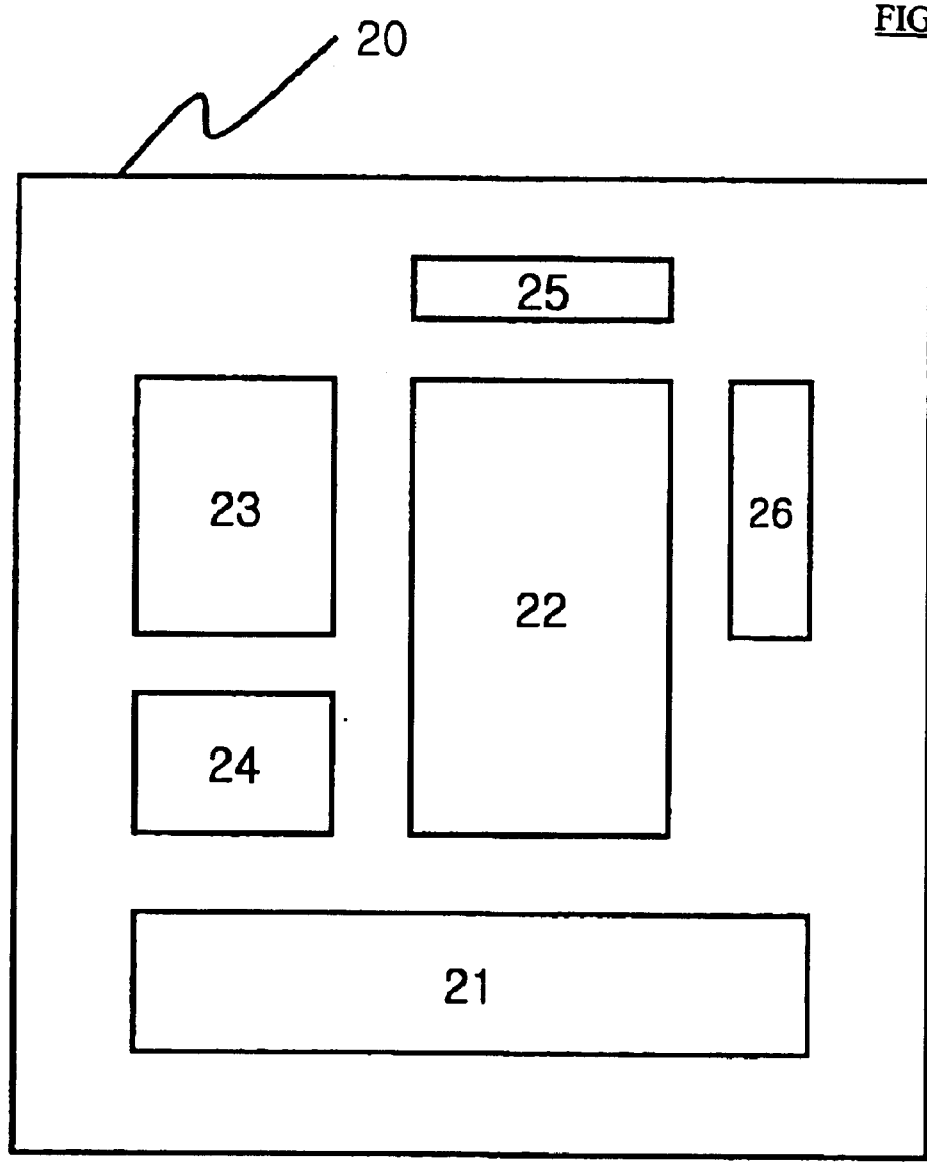
FIG. 6 is a circuit block diagram of a main control board with one embodiment of the present invention.

FIG. 6 is a circuit block diagram of a main control board with one embodiment of the present invention. The main control board(20) comprises a power supply circuit(21), a controller(22), a motor switch circuit(23), a lamp switch circuit(24), an operating switch connector(25), and a position sensor connector(26). The power supply circuit(21) converts an AC 220V input power into a DC 5V power. The DC 5V power is converted by an operating voltage of a digital circuit element, thereby changing into other voltage according to a used circuit element.

The controller(22) inputs a signal from an operating switch(30) or a position controlling sensor board(40), and has five functions as a controlling circuit. First, when it turns off on/off switches of a lamp of the operating switch while a light head(100) is unfolded, it drives a driving motor(70) to automatically fold the light head(100) up to the lowest point, and turns on the lamp while the on switch is operated.

Second, when an up button of the operating switch(30) is pressed, it applies a control signal to the driving motor(70) to unfold the light head(100). If a signal indicating an upper point is received from the position controlling sensor board (40), it stops the driving motor(70) not to unfold the light head(100) any more.

Third, when a down button of the operating switch(30) is pressed, it applies a control signal to the driving motor(70) to fold the light head(100). If a signal indicating the lowest point is received from the position controlling sensor board (40), it applies a control signal for stopping the driving motor(70) not to fold the light head(100) any more.

Fourth, when a user physically unfolds the light head (100) instead of operating the up button while the light head(100) is fully folded, it automatically unfolds the light head(100) up to the upper point by operating the driving motor(70). To see this procedure on a control data stream, when a signal indicating that a position sensor is separated from the lowest point without an input signal from the up button while maintaining the lowest point is inputted from the position controlling sensor board(40), it applies a control signal to the driving motor(70) to automatically unfold the light head(100).

Fifth, when a user attempts to fold the light head(100) by a physical force instead of operating the down button of the operating switch(30) while the light head(100) is fully unfolded, it operates the driving motor(70) to automatically fold the light head(100) up to the lowest point. To see this procedure on a control data stream, when a signal indicating that the position sensor is separated from the upper point without an input signal from the down button while maintaining the upper point is inputted, it applies a control signal to the driving motor(70) to automatically fold the light head(100). The controller can be embodied in different forms and should not be construed as limited to the embodiments set forth herein. Rather, these embodiments are provided so that this disclosure will be thorough and complete, and will fully convey the scope of the invention to those skilled in the art. The controller can be easily processed in hardware or software systems by using a microprocessor having a predetermined memory.

The fourth and the fifth functions of the controller(22) mentioned above are prepared for the case when a user forcibly operates the light head(100) instead of electrically operating lighting equipment of the present invention, preventing the light equipment from being damaged.

The motor switch circuit(23) generates a control signal driving the driving motor(70) when the up/down buttons of the operating switch(30) is pressed. The lamp switch circuit (24) turns on or off the lamp according to inputted on/off buttons of the lamp of the operating switch(30). The operating switch connector(25) is electrically connected to the operating switch(30), transmitting a switch state of the operating switch(30), and inputs on/off signal, up signal, and down signal of the lamp in connection with the operating switch(30). The position sensor connector(26) is electrically connected with the position controlling sensor board(40), receiving a sensing signal inputted from the position controlling sensor board(40), and inputs position signals of an upper point and the lowest point in connection with the position controlling sensor board(40).

Figure 7:
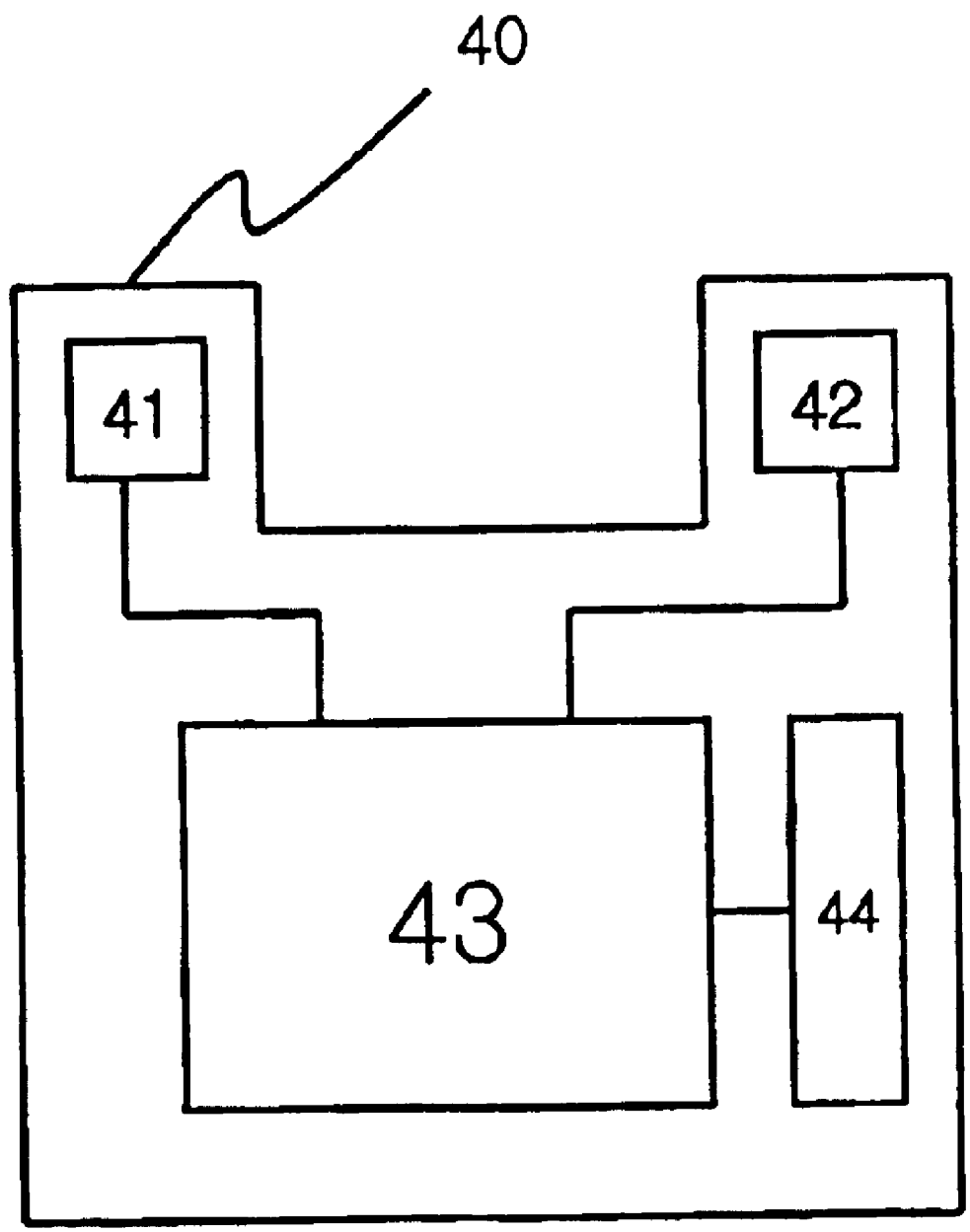
FIG. 7 is a circuit block diagram of a sensor board for position controlling with one embodiment of the present invention.

FIG. 7 is a circuit block diagram of a position controlling sensor board with one embodiment of the present invention. The position controlling sensor board(40) comprises a lowest point sensor(41), an upper point sensor(42), a signal processor(43), and a connecting terminal(44). When a small groove(64) is positioned in a sensor(41) of the position controlling sensor board(40) while a head connector(60) is rotated, the lowest point sensor(41) transmits a sensing signal. When the small groove(62) is positioned in a sensor (42) of the position controlling sensor board(40) while the head connector(60) is rotated, the upper point sensor(42) transmits a sensing signal to the signal processor(43). The signal processor(43) converts the inputted signal into an electrical signal, and transmits the electrical signal to the connecting terminal(44). The connecting terminal(44) is electrically connected to a main control board(20).

Figure 8:
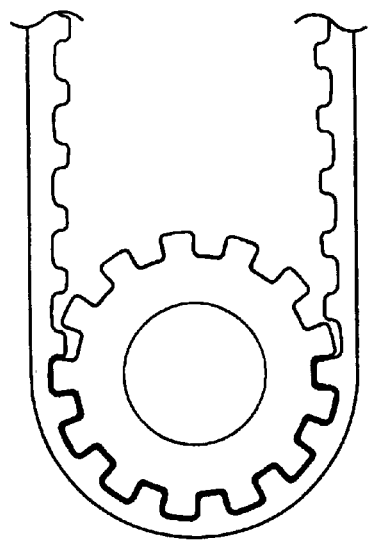
FIG. 8 is an explanatory diagram illustrating a state of a timing belt connector of a driving motor and a timing belt guide coupler performing a normal operation as well as illustrating a rippling state.
Figure 8:
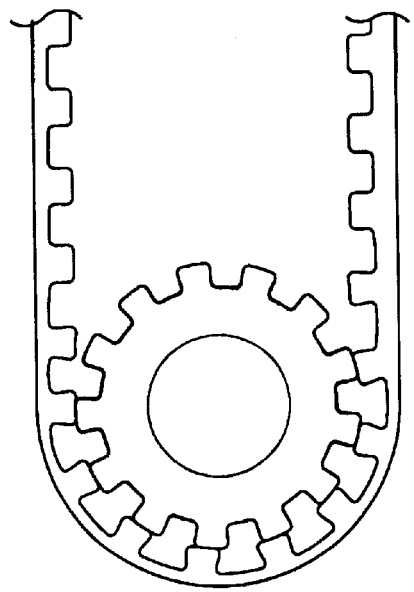

When a user forcibly unfolds or folds a light head(100) instead of electrically operating it, a timing belt is rippled, causing different upper and lowest points. To solve this problem, the present invention makes a timing belt connector(72) and a timing belt guide(73) of a driving motor(70) rippled shown in FIG. 8(b) when the light head (100) is in the upper or the lowest point, thereby easily compensating different upper and lowest points. FIG. 8(a) illustrates a timing belt(80) normally in gear with a combination of the timing belt connector(72) and the timing belt guide(73). FIG. 8(b) is a diagram illustrating that the timing belt(80) is rippled between the timing belt connector(72) and the timing belt guide(73).

An electric driven lighting in accordance with the present invention can control a light header by using an electric gear system, therefore it can firmly tighten the light head even though the light head is frequently used.

In addition, by automatically sensing upper/lowest points and a limit point of transmission shafts with a position sensor, the electric driven lighting in accordance with the present invention can prevent device damage caused by a wrong operation of a user familiar with an existing manual method, who manually controls a position by instantly forgetting an electric state of a device.

Lighting equipment of the present invention freely controls the angle of a light head by installing the most stable fixing unit with a solid gear and timing belt. Therefore, a user can consecutively find an optimum position of a light source, being used in various range from mood lighting with weak light strength to desk lamps with strong light strength.

What is claimed is:

1. An electric driven lighting electrically operating a light head, comprising:
    a driving motor generating a rotary power by using an electric power;
    a transmitter transmitting the rotary power of the driving motor to a separated position;
    a housing supporting the driving motor, and having a predetermined coupler;
    an operating switch operating the driving motor;
    a main control board controlling the driving motor according to the operating switch;
    a light head gear physically coupled with the housing through a predetermined connector, and receiving the rotary power of the driving motor through the transmitter; and
    a light head coupled with the light head gear, and having a lamp socket and a reflector inside.

2. The electric driven lighting of claim 1, wherein the light head gear further comprises a position sensor and the housing further comprises a position controlling sensor board inputting a sensing signal from the position sensor.

3. The electric driven lighting of claim 1, wherein the transmitter is a timing belt.

4. The electric driven lighting of claim 3, wherein the light head gear comprising,
    a head connector having a square shape whose two joint lines are missing, having a coupler connected to the light head on a head section of the square shape, forming a tail section into two parts, and having a corner piercing groove;

a timing belt connector inserted between the corner piercing groove, forming a groove receiving a rotary power of the timing belt, and forming the corner piercing groove inside;

a light head rotary coupled body inserted into the corner piercing grooves of the head connector and the timing belt connector, inserted into the corner piercing grooves for an external shape, and composed of a corner bar having a circular piercing groove inside; and a coupling screw coupling the light head rotary coupled body with the housing by using the predetermined coupler of the housing and the piercing groove of the corner bar.

5. The electric driven lighting of claim 1, wherein a motor driver comprises: a driving motor converting an inputted electric power into a mechanical rotary power;

a lower supporting plate having a predetermined rectangular piercing groove on a front side, having at least two vertical plates vertically extended on both sides by being separately positioned in an inner side, and forming a circular piercing groove around an end of each vertical plate;

a motor supporting board fixing the driving motor, forming a piercing groove for coupling with the rectangular piercing groove on a front side, and having a predetermined projector inserted into the circular piercing groove of the lower supporting plate; and a fixing screw inserted into the piercing groove and the rectangular piercing groove of the motor supporting board, and wherein the motor supporting board is vertically rotated by a pivot of the circular piercing groove.

6. The electric driven lighting of claim 5, wherein the motor driver further comprising an empty circular bar-shaped interval maintaining bar inserted into the fixing screw.

* * * * *